United States Patent [19]
Monticelli et al.

[11] 4,299,370
[45] Nov. 10, 1981

[54] REVOLVING FIXTURE FOR SUPPORTING TOOLS

[75] Inventors: Mario Monticelli, Moncalieri; Piero Barbero, Turin, both of Italy

[73] Assignee: DEA Digital Electronic Automation S.p.A., Turin, Italy

[21] Appl. No.: 37,130

[22] Filed: May 8, 1979

[30] Foreign Application Priority Data

May 9, 1978 [IT] Italy .............................. 68053 A/78

[51] Int. Cl.³ ............................................... E04G 3/00
[52] U.S. Cl. .................................... 248/278; 248/124; 248/DIG. 4
[58] Field of Search ................. 248/122, 124, DIG. 4, 248/183, 278; 33/172 R, 173

[56] References Cited

U.S. PATENT DOCUMENTS

| | | | |
|---|---|---|---|
| 2,571,853 | 10/1951 | Fontecchio | 248/DIG. 4 |
| 2,587,461 | 2/1952 | Gatimel | 248/122 X |
| 2,601,456 | 6/1952 | Porter | 33/172 UX |
| 2,601,965 | 7/1952 | Scalise | 248/DIG. 4 |
| 2,625,746 | 1/1953 | Rudhart | 248/DIG. 4 |
| 2,721,390 | 10/1955 | Pasturczak | 33/172 R |
| 3,531,867 | 10/1970 | Viollet | 33/173 |
| 3,596,863 | 8/1971 | Kaspareck | 248/183 X |
| 3,858,836 | 1/1975 | Marcyan | 248/278 |
| 3,883,103 | 5/1975 | Bartolat | 248/124 |

Primary Examiner—J. Franklin Foss
Attorney, Agent, or Firm—Gifford, VanOphem, Sheridan & Sprinkle

[57] ABSTRACT

A revolving fixture intended to support tools or instruments is described. Said fixture comprises first elements for the connection to a carrying structure, and second elements adapted to lock the said tool or instrument and rotatable relative to the said first elements about a main axis.

The main feature of this fixture is to comprise means apt to adjust, in a relatively precise, responsive and stable manner, the position of the said tool or instrument with respect to the said axis, so as to position the tip of the said tool or instrument in such a manner as to make it substantially coincide with a point of the said main axis and thus minimize the deviations of the tip of the tool or instrument from the said main axis during the rotation of the said second elements relative to the said first elements.

14 Claims, 7 Drawing Figures

REVOLVING FIXTURE FOR SUPPORTING TOOLS

BACKGROUND OF THE INVENTION

The present invention relates to a revolving fixture for supporting tools or instruments, in particular contact detector tools or other reading instruments in general, which fixture is connected to a carrying structure, generally a movable column of a machine tool or a measuring machine, and which allows rotating a portion which carries, clamped thereon, the tool or instrument, relative to a portion fixed to the carrying structure; the said rotation takes place about a main axis of the fixture, which axis generally coincides with the axis of the column of the machine, so as to allow to position as desired the tool or instrument. In fact, for example during the stage of scanning a surface of any shape, by means of a contact detector tool, the tip of the tool should preferably be always perpendicular to the surface to be scanned, and therefore it is necessary to have the possibility to rotate the tool itself to position it in the suitable position.

Therefore, fixtures for the aforementioned purposes have been proposed, which generally are provided with a sliding fit between the surface of the portion fixed to the support and the surface of the rotatable portion carrying the tool. Such fixtures, however, have the disadvantage that they are not able to ensure the obtainment, with a precision in the order of one $\mu m$, of the coincidence of the tip of the tool or instrument with the said main axis of rotation, so as to have the said tip always aligned with the said axis of rotation during the detection while the tool is rotating, and thus be always sure that the position of the tip is determined with a high precision, so that no reading errors due to asymmetries will occur; another disadvantage of these fixtures consists in that they are not able to ensure, with the said precision degree in the order of one $\mu m$, the position stability of the tip of the tool.

These disadvantages are due to the fact that the said prior art fixtures are not provided with a sufficiently responsive system for adjusting the position of the tip of the tool, and, moreover, are subject to clearance errors, etc., which do not ensure the stability of the tip of the tool.

SUMMARY OF THE INVENTION

It is the object of the present invention to provide a revolving fixture for supporting tools or instruments, of the type mentioned hereinabove, which will not have the disadvantages mentioned hereinabove and will ensure, with a sufficient precision and stability, the substantial coincidence of the tip of the tool or instrument relative to a main axis of rotation of the fixture.

According to the present invention there is provided a revolving fixture intended to support tools or instruments, comprising first elements for the connection to a carrying structure, and second elements adapted to lock the said tool or instrument and rotatable relative to the said first elements about a main axis, wherein the said fixture comprises means apt to adjust, in a relatively precise, responsive and stable manner, the position of the said tool or instrument with respect to the said main axis, so as to position the tip of the said tool or instrument in such a way as to make it substantially coincide with a point of the said main axis and thus minimize the deviations of the tip of the tool or instrument from the said main axis during the rotation of the said second elements relative to the said first elements.

BRIEF DESCRIPTION OF THE DRAWINGS

For a better understanding of the present invention, some embodiments will now be described, by way of non limiting examples, with reference to the accompanying drawings, in which.

DETAILED DESCRIPTION OF THE INVENTION

Figure 1:
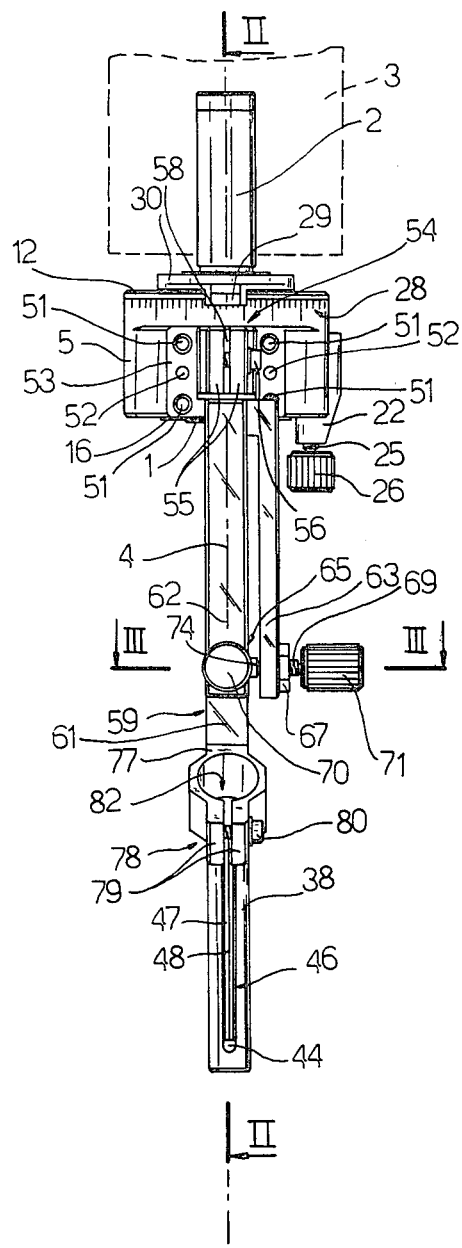
FIG. 1 is a side view of a first embodiment of the fixture according to the present invention.
Figure 3:
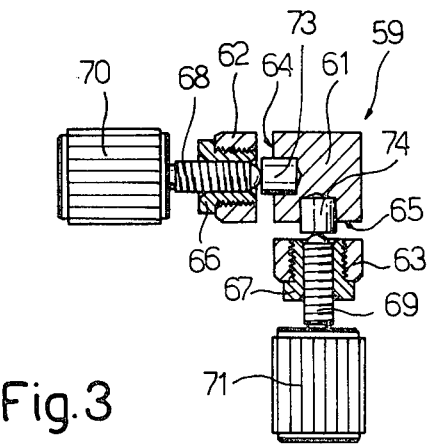
FIG. 3 is a section along the line III—III of FIG. 1.
Figure 2:
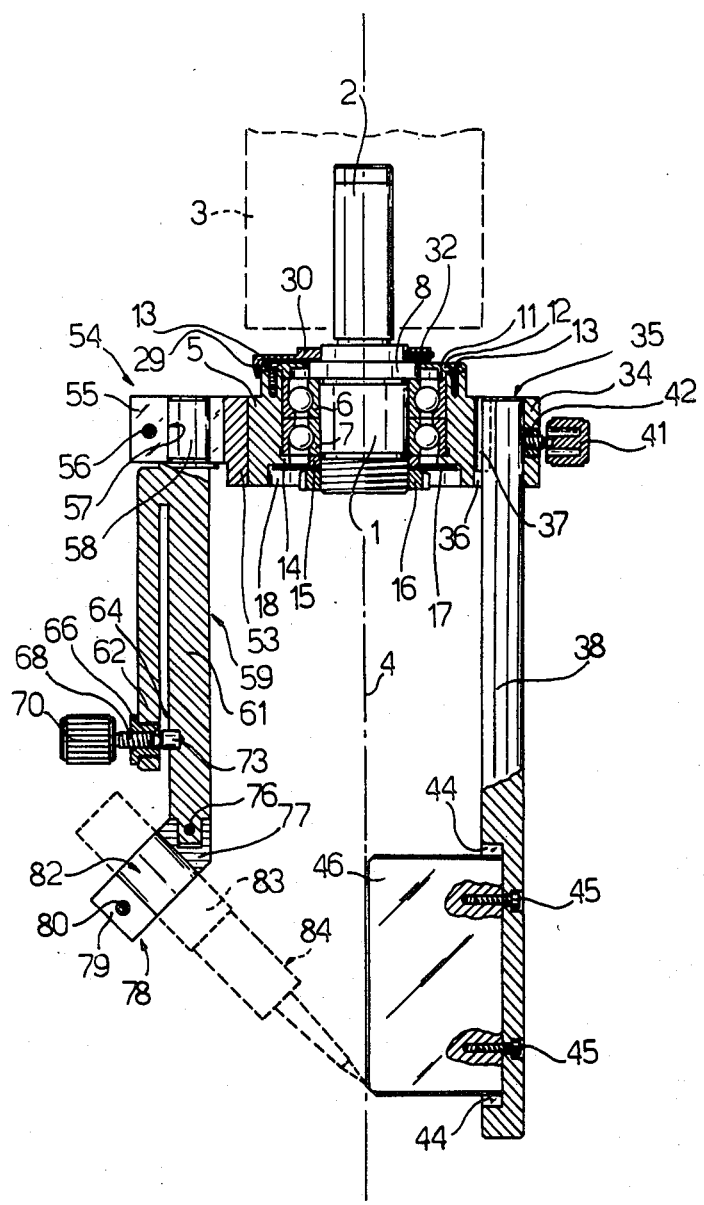
FIG. 2 is a section along the line II—II of FIG. 1.
Figure 4:
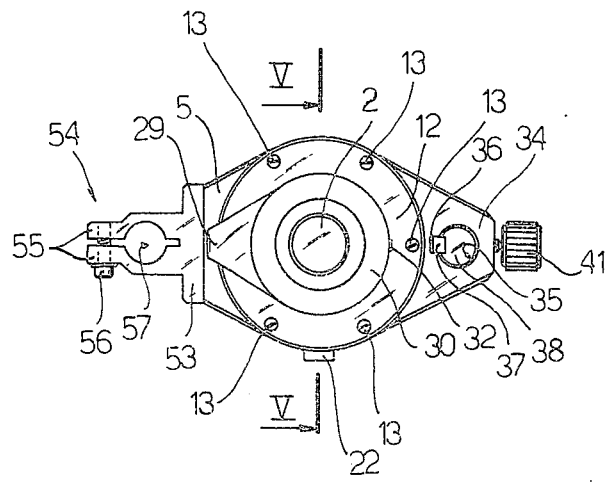
FIG. 4 is a top view of the fixture shown in FIG. 1.

Referring now to FIGS. from 1 to 5, the fixture according to the present invention comprises a central portion 1, cylindrical in shape, which forms, on the upper part, a cylindrical tang 2 for the connection, in a well-known manner, to a carrying structure, in particular to an end of a column 3 of a measuring machine.

The axis of the central portion 1 and of the tang 2, indicated by reference numeral 4, forms the main axis of the fixture, about which a hollow and approximately elongated body 5, conveniently made of a light alloy, for instance aluminium, may rotate. Between the body 5 and the central portion 1, in order to allow the rotation of the said body 5, there are disposed two superposed ball bearings 6 and 7. These bearings 6 and 7 are of the angular contact oblique type with clearance taking-up and pre-established preloading (known as DOSA DOS type). The upper side of the inner race of the bearing 6 is positioned against an annular shoulder 8 of the central portion 1, whilst a lower annular projection 11 of a annular cover 12 fastened to the body 5 by means of screws 13 abuts against the upper side of the outer race of the bearing 6.

The lower side of the outer race of the bearing 7 abuts against an inner annular shoulder 14 of the body 5, whilst an annular spacer 15, retained by a ring nut 16 screwed on the lower threaded end of the central portion 1, abuts against the lower side of the inner race of the bearing 7. The said ring nut 16, besides eliminating the clearance between the bearings 6 and 7, locks an annular metal lamination 17 between the end of the ring nut 16 itself and the annular spacer 15.

Figure 5:
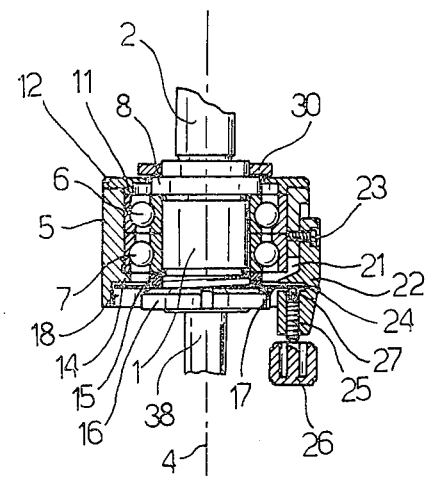
FIG. 5 is a section along the line V—V of FIG. 4.

Annular lamination 17 is received in a circular lower cavity 18 of the body 5, which cavity 18 is provided with a side opening 21 (FIG. 5) having partially accomodated therein the lower portion of a substantially L-shaped support body 22 which is fastened at its its upper portion, by means of a screw 23, to the lateral zone of the body 5. Formed in the lower portion of the body 22 is a slot 24 into which the outer end portion of the lamination 17 passes without contact, and perpendicularly to the plane of the slot 24 there is formed a hole having screwed therein, on the lower part of support body 22, a threaded stem 25 of a knob 26 which serves to lock the rotation; the end of the said stem 25 exerts a pressure against a pad 27, made conveniently of copper, which may contact the lamination 17 in the slot 24.

On the upper lateral region of the body 5 lines 28 are traced which provide an angular graduation and with which an index 29 of a cover 30 cooperates, which cover is fixed by means of a dowel 32 to the upper side of the central portion 1.

Formed in the end portion 34 of the body 5 are a through hole 35 and a vertical groove 36 serving to accomodate therein a reference key 37, rigidly connected to a bar 38 of circular cross-section, and the upper portion of the bar 38 itself. The said bar 38 is fastenable to the body 5 by means of a fastening knob 41 whose stem is screwable into a threaded bushing 42, made conveniently of steel, fixed in the portion 34, and whose end cooperates with the upper portion of the bar 38.

Formed in the lower portion of the bar 38 is a recess 44 having fastened therein, by means of screws 45, the rear portion of a reference plate 46, made conveniently of steel, having substantially the configuration of a rectangular prism, along the front portion of which there is formed a slight cavity 47 having centrally traced therein a reference line 48 which coincides with the main axis 4.

Fastened to the body 5 by means of screws 51 and dowels 52, in a position diametrically opposed to the end portion 34, is a base 53 of a fork-shaped body 54 having two arms 55 which are connected to one another, at their end portion, by a screw 56.

Formed between the said two arms 55 is a circular hole 57 having clamped therein an upper cylindrical portion 58 of a toolholding arm 59.

The said arm 59, made conveniently of steel and having the configuration of a bar of square cross-section, has a central portion 61, and extending downwardly from the upper part of the said portion 61 are two portions 62 and 63, also in the form of a bar of rectangular cross-section, which extend parallel to the axis of the central portion 61 in front of two lateral orthogonal surfaces 64 and 65 of the portion 61 and are sufficiently spaced from the surfaces 64 and 65. In fact, towards the free lower ends of the portions 62 and 63 there are inserted two hardened nut screws 66 and 67, having threaded therein two stems 68 and 69 which carry two knobs 70 and 71 for the final adjustment of the position of the tool. The ends of the stems 68 and 69, which have their axis perpendicular to the surfaces 64 and 54, respectively, of the the portion 61, abut perpendicularly onto two hardened pads 73 and 74 which are driven into the surfaces 64 and 65 of central portion 61, respectively.

Fastened to the lower end of the central portion 61 of the arm 59 by means of a pin 76 is a base 77 of a fork-shaped body 78 having two arms 79 which are connected to one another at their end by means of a screw 80. Between the said two arms 79 there is formed a circular hole 82 which has its axis extending substantially at 45° with respect to the main axis 4 and in which a cylindrical portion 83 of a tool 84 is clamped.

Figure 7:
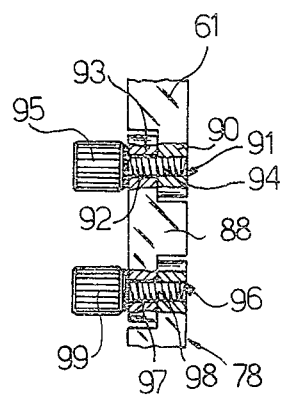
FIG. 7 is a partially sectional side view of a portion of the fixture shown in FIG. 6.
Figure 6:
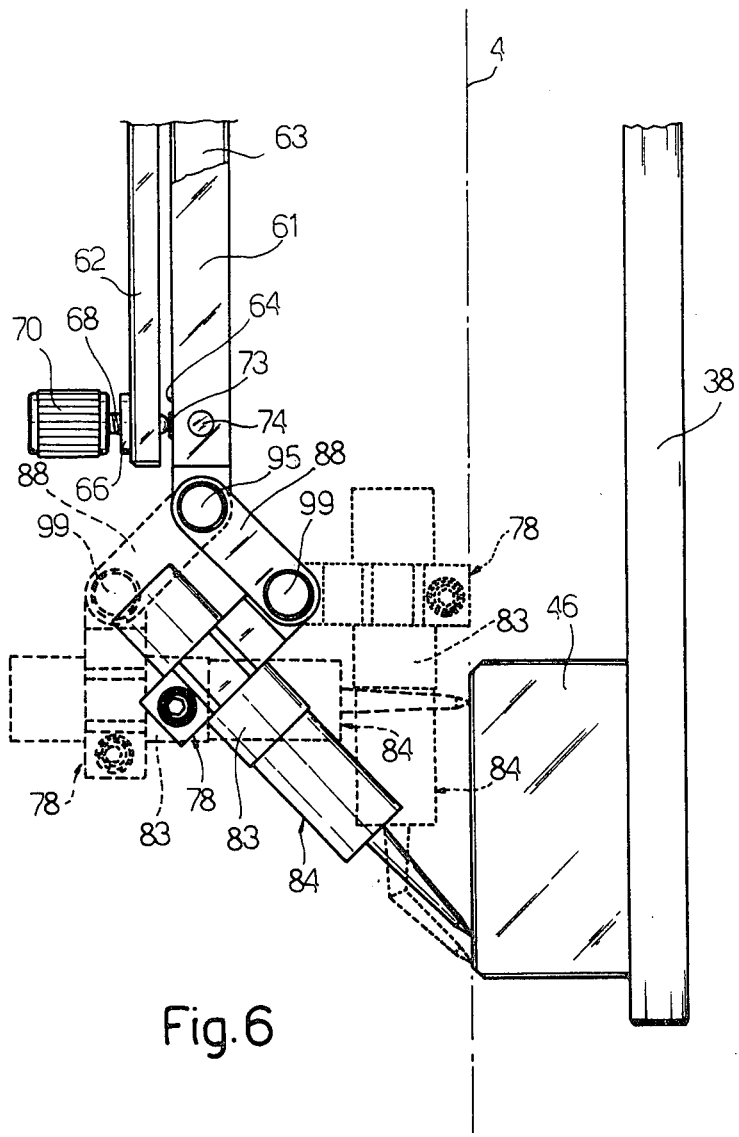
FIG. 6 is a side view of a different embodiment of a portion of the fixture according to the invention, in three different positions.

The embodiment shown in FIGS. 6 and 7 differs from the preceding one in that to the lower end of the central portion 61 of the arm 59 there is no longer connected the fork-shaped body 78, but rather the end of a portion 88, which is in turn connected, at its other end, to an end of the fork-shaped body 78. In particular, the lower end of the portion 61 has a zone 90 of reduced cross-section, in which a threaded hole 91 is formed which is coaxial to a hole 92 formed in a zone 93, also of reduced cross-section, of the portion 88. Inserted into the holes 91 and 92 is a threaded pin 94 having an outer clamping knob 95.

Analogously, the other end of the portion 88 is also of reduced cross-section, as is the connected end of the fork-shaped body 78, and formed in the said other end of the portion 88 are a threaded hole 96 and a hole 97, into which a threaded pin 98 is inserted which carries an outer clamping knob 99.

The operation of the revolving fixture according to the present invention is as follows.

Referring to the embodiment shown in FIGS. from 1 to 5, first of all the fixture is connected to the carrying structure by connecting the cylindrical tang 2 to the column 3. Then, the upper portion of the bar 38 is inserted into the hole 35 of the end portion 34 of body 5 and is fastened by means of the fastening knob 41. The position of the bar 38 relative to the body 5 is determined by the insertion of the key 37 into the groove 36, so that the coincidence of the reference line 48 of the plate 46 with the main axis 4 is ensured. Connected to the fork-shaped body 54 is also, by means of the screw 56, the upper portion 58 of the arm 59 which carries the fork-shaped body 78 whose hole 82 has inserted therein the cylindrical portion 83 of a tool (conveniently, a detecting contact instrument of known type).

Thereafter a first stage of adjustment of the position of the tip of the tool is initiated, in which stage the tool 84 is moved within the housing defined by the hole 82, so as to bring the said tip into contact with the plate 46 and to make it coincide with the reference line 48; the tool 84 is then clamped on the side fork-shaped body 78, and, consequently, relative to the arm 59, by screwing the screw 80.

After having accomplished this first stage of adjustment, in which the tip of the tool is already brought substantially in vicinity to the main axis 4, with the precision which depends upon the precision of the positioning of the plate 46, this latter is removed by releasing the knob 41 and thus disengaging the upper end of the bar 38, and thereafter a second, much more precise, stage of adjustment of the position is initiated, so as to bring the tip of the tool 84 into substantial alignment with the main axis 4. This second stage of adjustment is carried out in accordance with known methods of adjustment of the tip of a tool (known as "re-qualification methods"), used for various applications and utilizing a ground reference sample block on which measurements of pairs of points are carried out on opposed sides and on the same axis, and along two orthogonal directions. By comparing the results of these measurements with the reference sample values it is possible to introduce the initial corrections to eliminate the calibration errors.

Thus, in this second stage of adjustment, with the tip of the tool 84 the said measurements of pairs of points on opposed sides are carried out, so as to have, for the two orthogonal directions, the values of the calibration errors, and these errors are neutralized, by means of the adjustment of the position of the knobs 70 and 71, which through the stems 68 and 69 act on the position of the central portion 61, along the two directions orthogonal to the main axis 4. Therefore, the central portion 61, and hence the tool 84 connected to it, is moved along the said two orthogonal directions, so that the tip of the tool 84 comes to substantially coincide with a point of the main axis 4.

This second adjustment stage is carried out through successive adjustments of the knobs 70 and 71.

At this point, the revolving fixture has been adjusted and can be utilized for the measurement, in such a way that through the movement imparted to the column 3 the tool 84 is approached to the surface to be scanned, with the tip of the tool 84 which is perpendicular to the said surface, and the desired positioning of the tool 84 is obtained by rotating the body 5 relative to the central portion 1, about the main axis 4, until, when the desired positioning is obtained, the said body 5 is clamped relative to the central portion 1 by means of the clamping knob 26 which, by pushing the pad 27 against the lamination 17, clamps the body 22 (rigidly connected to the movable body 5) to the said lamination 17 (rigidly connected to the stationary central portion 1).

In case it is desired to utilize a tool whose tip is perpendicular to the main axis 4, the tool 84 may be used, but it has to be connected not to the fork-shaped body 88, but to a fork-shaped body having the hole 82 arranged so as to have its axis perpendicular to the said main axis 4, or it is possible to utilize a fork-shaped body whose hole 82 has its axis parallel to the said main axis 4, and to which a tool is connected whose tip has a first section parallel to the axis 4 and a second section bent orthogonally, i.e. perpendicular to the said axis 4.

With the embodiment shown in FIGS. 6 and 7, for utilizing such tools of different shapes or with the tip inclined in a different manner relative to the main axis 4, it is not necessary to substitute the fork-shaped body 78 (generally, the whole assembly of the arm 59 is substituted), but it is sufficient to only position in a different manner the portion 88 with respect to the end section of the portion 61 (by the knob 95) and the fork-shaped body 78 with respect to the portion 88 (by the knob 99). The clamping of the knobs 95 and 99 ensures the maintainment of any configuration imparted, three of which are shown as examples in FIG. 6, but it is clear that any intermediate position between those which are shown can be obtained.

Thus, with the revolging fixture according to the present invention it is possible to obtain, with a precision in the order of one μm, the coincidence of the tip of the tool or instrument with the main axis of rotation of the fixture, so that the reading errors due to the asymmetries in consequence of rotations of the tool about the said main axis, are minimized. Such coincidence of the tip of the tool or instrument with the said main axis is obtained thanks to the adjustment stages, divided in two parts, in which first the reference plate 46 is utilized and then the knobs 70 and 71 are operated which, due to the coupling between the portions 62, 63 and the central portion of the arm 59, allow to obtain a micrometric movement of the tip of the tool and, consequently, a very precise adjustment of the position of the tip of the tool.

Moreover, it is also possible to ensure, with the said precision in the order of one μm, the stability of the position of the tip of the tool, both in the rest condition and in use. This possibility is ensured by the fact that the bearings 6 and 7 are utilized which do not introduce any clearance errors, asymmetries, etc., during the rotation of the body 5 relative to the central portion 1, as well as by the fact that the device for locking the position of the body 5 relative to the central portion, which device is actuated by means of the knob 26, acts in a direction parallel to the main axis 4, (action of the stem 25 onto the lamination 17) and therefore does not give rise to any radial movement between the said movable body 5 and the central portion 1.

Finally, it is clear that many modifications and variations may be applied to the embodiments of the revolving fixture according to the present invention which have been described hereinabove and shown in the accompanying drawings, without departing from the scope of the inventive idea of the present invention.

What we claim is:

1. A revolving fixture intended to support tools or instruments, comprising first elements for the connection to a carrying structure, and second elements adapted to lock the said tool or instrument and rotatable relative to the said first elements about a main axis, wherein the said fixture comprises means apt to adjust, in a relatively precise, responsive and stable manner, the position of the said tool or instrument with respect to the said main axis, so as to position the tip of the said tool or instrument in such a manner as to make it substantially coincide with a point of the said main axis and thus minimize the deviations of the tip of the tool or instrument from the said main axis during the rotation of the said second elements relative to the said first elements, the said means comprising first and second means for adjusting the substantial coincidence of the tip of the said tool or instrument with the said main axis, in two respective separate stages, the said first means comprising a body, on a portion of the surface of which the said main axis passes, and the said second means comprising two adjustment elements arranged to act on a first portion of the said second elements which supports the said tool or instrument, along two directions orthogonal to one another, so as to move the tip of the said tool or instrument, along directions which are substantially contained in a plane perpendicular to the said main axis.

2. A fixture as claimed in claim 1, wherein on the said portion of surface of the said body of said first means a reference line is traced which substantially coincides with the said main axis, and wherein the surface of the said body, along the said reference line, is slightly concave, so as to facilitate the approaching of the tip of the said tool or instrument to the said reference line.

3. A fixture as claimed in claim 1, wherein the said body is fastenable to the said second elements.

4. A fixture as claimed in claim 3, wherein means are provided for rendering unique the arrangement of the said body relative to the said second elements.

5. A fixture as claimed in claim 1, wherein the said first portion of the said second elements is bar-shaped and that the said two adjustment elements are disposed towards the free end of two portions of the said second elements, the said two portions being connected, at the other end, to the said first portion and being disposed in front of and spaced from the said first portion.

6. A fixture as claimed in claim 5, wherein the said two adjustment elements comprise two threaded stems disposed towards the free end of the said two portions of the said second elements, along the said two directions orthogonal to one another, and acting, with the ends, on the said first portion.

7. A fixture as claimed in claim 1, wherein one end of the said first portion is removably fastened to the said second elements.

8. A fixture as claimed in claim 1, wherein the other end of the said first portion has rigidly fastened thereto an element for clamping the said tool or instrument.

9. A fixture as claimed in claim 1, wherein connected to the other end of the said first portion is an articulated system for revolving and locking an element serving to clamp the said tool or instrument.

10. A fixture as claimed in claim 1, wherein between the said second elements and the said first elements there are disposed bearings for allowing the rotation of the said second elements relative to the said first elements.

11. A fixture as claimed in claim 10, wherein the said bearings are ball bearings of the angular contact oblique type with clearance taking-up and pre-established pre-loading.

12. A fixture as claimed in claim 11, wherein the said bearings are of the type DOSA DOS.

13. A fixture as claimed in claim 1, wherein means are provided for locking the position of the said second elements relative to the said first elements, the said locking means comprising elements apt to act between bodies of the said first and second elements, along directions parallel to the said main axis, and the said elements apt to act between bodies of the said first and second elements comprising a threaded stem acting onto a lamination of the said first elements, which lamination is disposed in a recess of the said second elements.

14. An adjustment method for adjusting the position of tools or instruments, in a revolving fixture for supporting the tools or instruments, comprising first elements for the connection to a carrying structure, and second elements arranged to clamp the said tool or instrument and rotatable, relative to the said first elements, about a main axis, wherein the method comprises a first stage of adjustment of the position of the said tools or instruments relative to the said main axis by means of first means, a second stage for disengaging the said first means, a third stage of precise adjustment of the position of the said tools or instruments relative to the said main axis, by means of second means, in order to bring the said tool or instrument to a position of substantial coincidence with a point of the said main axis, and a fourth locking stage for locking the position of the said second elements relative to the said first elements.

* * * * *